US006891466B2

(12) United States Patent
Turner et al.

(10) Patent No.: US 6,891,466 B2
(45) Date of Patent: May 10, 2005

(54) BROAD BANDWIDTH, HIGH IMPEDANCE TRANSPONDER FOR ELECTRONIC IDENTIFICATION SYSTEM

(76) Inventors: Christopher Gordon Gervase Turner, Remainder of 256 Hofmeyer Road, President Park, Agricultural Holdings, Halfway House, 2068 Gauteng (ZA); David Edwin Proctor, 320 Olievenhout Avenue, North Riding, Randburg, 2040, Gauteng (ZA); Andries Petrus Cronje Fourie, 38 Donegal Drive, Greenside East 2193, Gauteng (ZA)

( * ) Notice: Subject to any disclaimer, the term of this patent is extended or adjusted under 35 U.S.C. 154(b) by 429 days.

(21) Appl. No.: 09/881,741

(22) Filed: Jun. 18, 2001

(65) Prior Publication Data

US 2002/0014993 A1 Feb. 7, 2002

(30) Foreign Application Priority Data

Jun. 19, 2000  (ZA) ........................................ 2000/3072

(51) Int. Cl.[7] ............................ H01Q 1/50; G06K 19/07
(52) U.S. Cl. ............. 340/10.1; 340/572.7; 343/700 MS
(58) Field of Search .................. 343/795, 700 MS, 343/767, 803, 850; 342/51; 340/572.4, 10.1, 572.7

(56) References Cited

U.S. PATENT DOCUMENTS

| | | | |
|---|---|---|---|
| 4,737,790 A | * | 4/1988 | Skeie et al. .................... 342/51 |
| 5,317,330 A | | 5/1994 | Everett et al. |
| 5,861,848 A | * | 1/1999 | Iwasaki ................ 343/700 MS |
| 5,952,922 A | * | 9/1999 | Shober ..................... 340/572.4 |
| 6,054,925 A | | 4/2000 | Proctor et al. |
| 6,346,922 B1 | * | 2/2002 | Proctor et al. .............. 343/795 |

FOREIGN PATENT DOCUMENTS

| | | |
|---|---|---|
| EP | 0 638 872 A1 | 2/1995 |
| GB | 2 321 726 A | 8/1998 |
| WO | WO 002/26993 | 5/2000 |

OTHER PUBLICATIONS

Proctor, D.E., et al., "Hybrid Antenna Arrangem ent For Use With Electronic Identification Systems", U.S. Appl. No. 09/495,456, filed on Feb. 1, 2000.

* cited by examiner

Primary Examiner—Edwin C. Holloway, III
(74) Attorney, Agent, or Firm—Finnegan, Henderson, Farabow, Garrett, & Dunner, L.L.P.

(57) ABSTRACT

A transponder 14.1 for an electronic radio frequency identification system comprises an antenna 18 having an antenna impedance at a feedpoint thereof. The transponder further comprises an electronic circuit 19 having an input connected to the antenna. The antenna impedance having impedance characteristics for developing first and second voltage maxima (36, 38) across the input at first and second frequencies ($f_L$ and $f_H$) respectively, thereby to provide a continuous operative frequency band for the transponder including the first and second frequencies.

11 Claims, 8 Drawing Sheets

BROAD BANDWIDTH, HIGH IMPEDANCE TRANSPONDER FOR ELECTRONIC IDENTIFICATION SYSTEM

INTRODUCTION AND BACKGROUND

THIS invention relates to electronic radio frequency (RF) identification systems comprising a reader and a plurality of transponders. The invention more particularly relates to transponders forming part of such a system.

Known electronic systems of the aforementioned kind comprise an interrogator or reader comprising a transmitter for transmitting an energizing or interrogation signal to the transponders and a receiver for receiving a response signal from the transponders. A microprocessor in the reader identifies a particular transponder by a data stream in the response signal. Each transponder comprises an antenna connected to an integrated circuit hosting electronic circuitry for receiving and collecting power from the interrogation signal to present a high enough voltage on a voltage storage capacitor, to power the circuitry which in turn generate the aforementioned data stream. The data stream is used by the transponder to modulate the energizing signal and to reflect back to the reader a portion of the energy in the energizing signal, by what is known as backscatter modulation. In the applicant's U.S. Pat. No. 6,054,925, there is disclosed a transponder with a high input impedance which the applicant believes will improve on the limited effective distance of prior art systems. The higher the input impedance of the integrated circuit and the antenna feedpoint impedance, the higher the voltage recovered from the energizing signal and stored on the capacitor.

It is also known that the higher the aforementioned impedances, the higher the quality factor (Q) of the circuit and consequently the narrower the bandwidth of the transponder becomes. Known transponders with relatively high impedances have a bandwidth of in the order of 1%–2%. The applicant has identified a need for a practical system to cover the range 860 MHz to 930 MHz and which hence requires a bandwidth of about 7% to 10%.

In U.S. Pat. No. 5,317,330 to Everett there is disclosed a two way communication system wherein a series or resonant circuit and a parallel or anti-resonant circuit are utilized to divide a bandwidth into a transmitting part and a separate receiving part. The result is two discrete narrow bands for use in transmitting and receiving coded information at different frequencies. Such a system would not be able to cover the aforementioned range adequately.

OBJECT OF THE INVENTION

Accordingly it is an object of the present invention to provide an electronic identification system and a transponder with which the applicant believes the aforementioned disadvantages may at least be alleviated.

SUMMARY OF THE INVENTION

According to the invention there is provided a transponder for an electronic identification system comprising:
  an antenna having an antenna impedance at a feedpoint thereof;
  an electronic circuit having an input impedance at an input thereof, the input being connected to the feedpoint; and
  the antenna impedance having frequency dependent impedance characteristics for developing first and second voltage maxima across the input at first and second frequencies respectively, thereby to provide a continuous operative frequency band for the transponder including the first and second frequencies.

The circuit may have an input impedance comprising a real component and a capacitive reactive component.

An inductive element may be connected between the antenna and the circuit in parallel with the input impedance and which is operative to resonate with the capacitive component of the input impedance.

The real part of the input impedance may be at least 400 ohms, typically 1000 ohms and is preferably larger than 1500 ohms.

The first frequency may be between 850 MHz and 900 MHz and the second frequency may be between 900 MHz and 1 GHz.

The antenna may comprise any one of a combination of a patch antenna and a transmission line both connected to the feedpoint; a combination of a shorted ring patch antenna and a transmission line both connected to the feedpoint; and a combination of a loop and an appendage to the loop. The appendage may comprise a second loop.

The first and second frequencies may be associated with first and second dimensions of the antenna and the first and second frequencies may be selected by appropriate selection of the first and second dimensions.

Also included within the scope of the present invention is an antenna having an antenna impedance at a feedpoint thereof, the antenna impedance having frequency dependent impedance characteristics for developing first and second voltage maxima at first and second frequencies respectively across an input impedance of a transponder thereby to provide a wide continuous operative frequency band for the transponder, The antenna may comprise one of a combination of a patch antenna and a transmission line both connected to the feedpoint; a combination of a shorted ring patch antenna and a transmission line both connected to the feedpoint; and a combination of a loop and an appendage to the loop. In the latter case, at least part of the loop or appendage may have a zigzag configuration.

The invention also extends to an electronic radio frequency identification system comprising a reader or interrogator and at least one transponder as herein defined and/or described.

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 1:
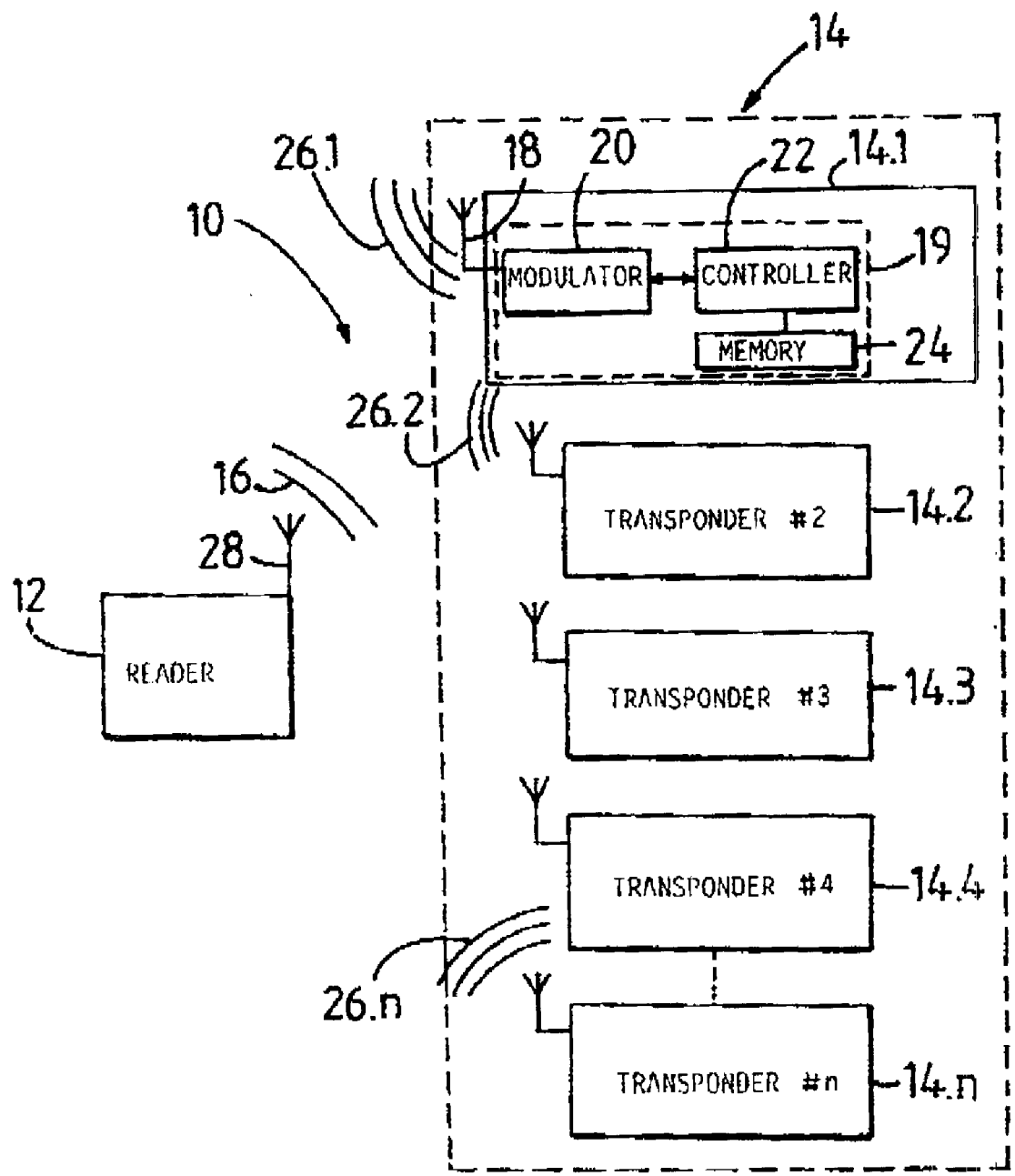
FIG. 1 is a block diagram of an electronic radio frequency (RF) identification system.

An electronic radio frequency identification (RFID) system according to the invention is generally designated by the reference numeral 10 in FIG. 1.

The system comprises a reader 12 and a transponder population 14 comprising transponders 14.1 to 14.n. In use, the transponders may be mounted on or otherwise associated with items or articles (not shown) to be counted or identified. The transponders are preferably passive transponders in that they derive power to operate, from an energizing signal 16 transmitted by the reader. The transponders are similar in configuration and therefore transponder 14.1 only will be described further. Transponder 14.1 comprises an antenna 18, an integrated circuit 19 connected to the antenna and comprising a modulator 20, a controller 22 and a memory arrangement 24.

In use, the reader transmits an energizing signal 16 having a frequency $f_c$ towards the transponder population 14. The transponders derive their power from this signal as is known in the art and transmit respective response signals 26.1 to 26.n by backscatter modulating the signal in known manner with data pre-stored in memory arrangement 24. The reader sequentially locks onto one of the response signals and reads the data as will hereinafter be described. Once the population has been read, the aforementioned items are identified and/or counted.

Figure 2:
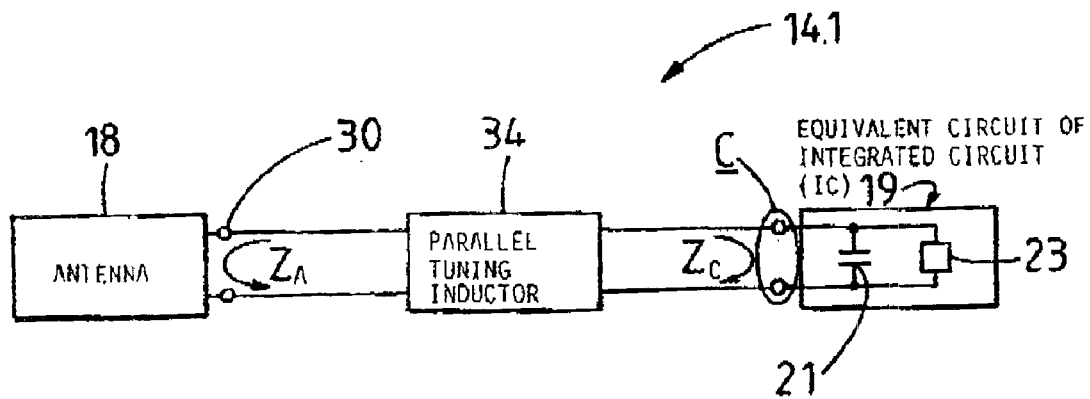
FIG. 2 is a very basic block diagram of a transponder according to the invention.

A block diagram of the transponder 14.1 is shown in FIG. 2. The transponder 14.1 comprises an antenna 18 having a feedpoint 30 in a region thereof where there is a current minimum, so that it has a relatively high feedpoint impedance $Z_A$. The antenna feedpoint 30 is connected to input C of the aforementioned integrated circuit (IC) 19, having an input impedance $Z_c$. A typical input impedance of the IC 19 comprises a capacitance 21 of about 1.95 pF capacitor 21 in parallel with a resistance 23 of larger than 400 ohms, typically larger than 1000 ohms and preferably 1600 Ω. A parallel tuning inductor 34 is connected between the antenna 18 and IC 19.

Figure 3:
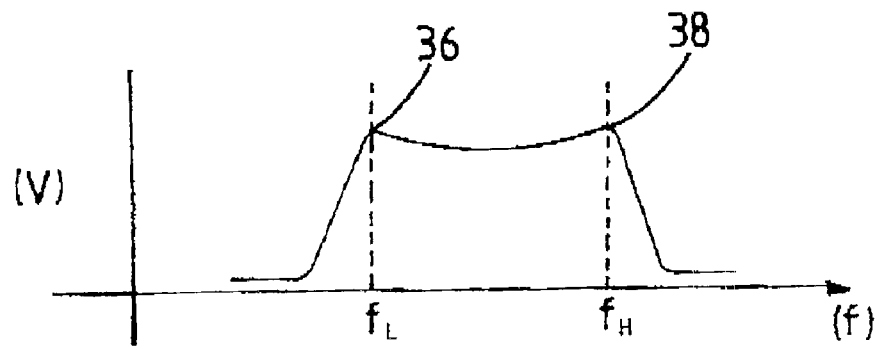
FIG. 3 is a basic diagram of voltage against frequency at point C of the transponder according to the invention in FIG. 2.

In FIG. 3, there is shown a diagram of voltage developed across the input impedance $Z_c$ of the IC against frequency of an incident energizing signal 16. It will be seen that first and second voltage maxima 36 and 38 are developed at first and second frequencies $f_L$ and $f_H$ respectively. With the first frequency $f_L$ between 850 MHz and 900 MHz, preferably 860 MHz, and the second frequency $f_H$ between 900 MHz and 1 GHz, preferably 930 MHz, the transponder 14.1 provides wideband characteristics, superior to that of prior art transponders.

Figure 4:
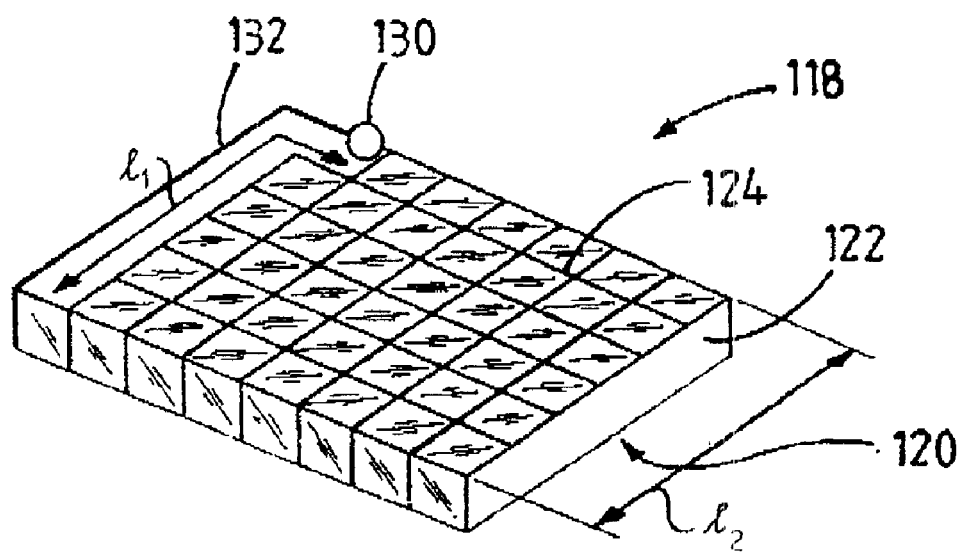
FIG. 4 is a diagram of a first embodiment of an antenna forming part of the transponder according to the invention.
Figure 5:
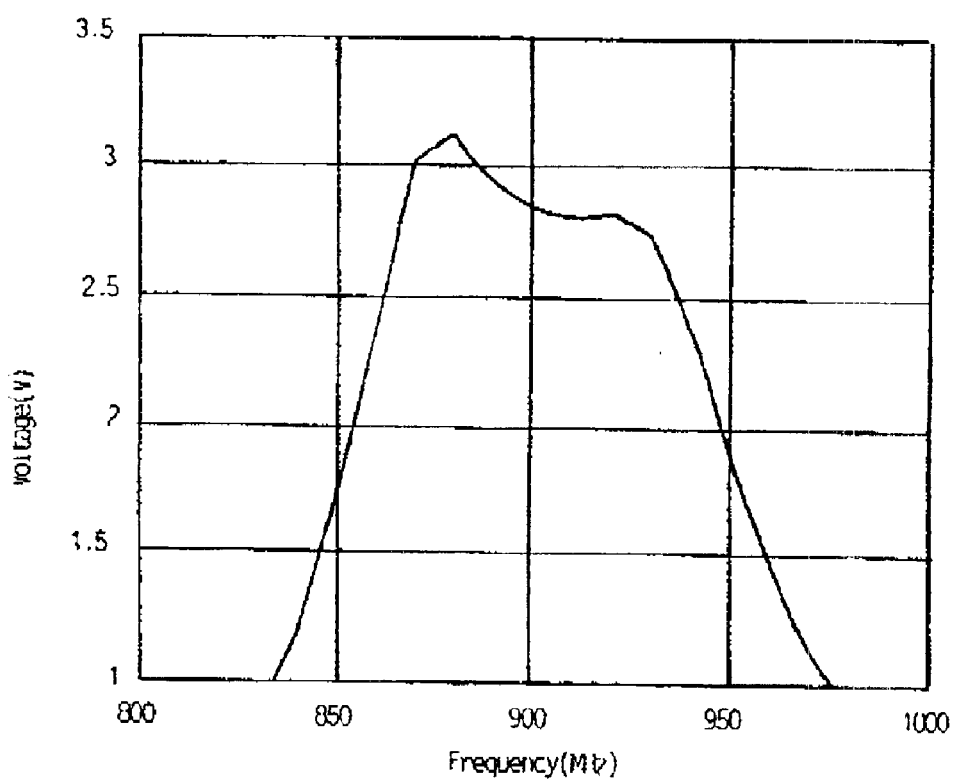
FIG. 5 is a diagram of voltage against frequency at point C of the transponder in FIG. 2 comprising the antenna in FIG. 4.

A first embodiment 118 of an antenna according to the invention for use with a transponder 14.1 is shown in FIG. 4. The antenna 118 is a patch antenna comprising a conductive ground plane 120, on one face of a dielectric layer 122 of about 10 mm in thickness and a grid or conductive layer 124 on another face and connected to the ground plane 120 as shown. The antenna 118 is driven at feedpoint 130 located in a region where there is a current minimum. A conductor or transmission line 132 having a length $l_t$ is integrated with the patch antenna and is also connected to the feedpoint 130 and layer 124. The resulting transponder 14.1 has a voltage against frequency curve at C in FIG. 2, as shown in FIG. 5, clearly displaying dual voltage maxima and consequent wideband characteristics. The frequencies $f_L$ and $f_H$ may be manipulated by manipulating dimensions $l_1$, and $l_2$. It is believed that the frequency dependent antenna impedance is substantially matched at frequencies $f_L$ and $f_H$ to the input impedance $Z_c$, resulting in the voltage maxima developed across the input impedance at C at these frequencies.

Figure 6:
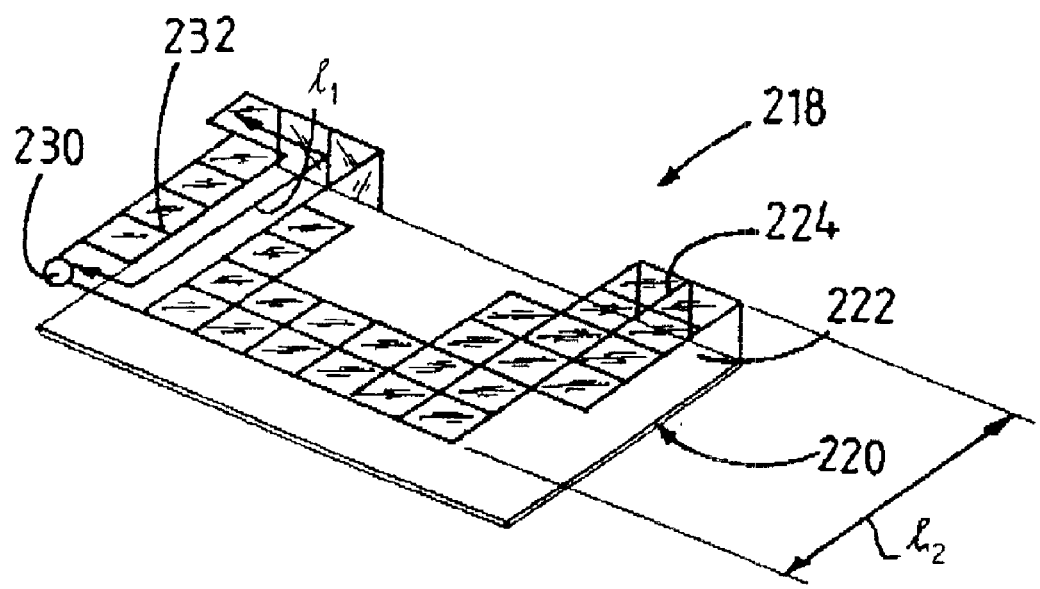
FIG. 6 is a diagram of a second embodiment of an antenna forming part of the transponder according to the invention.
Figure 7:
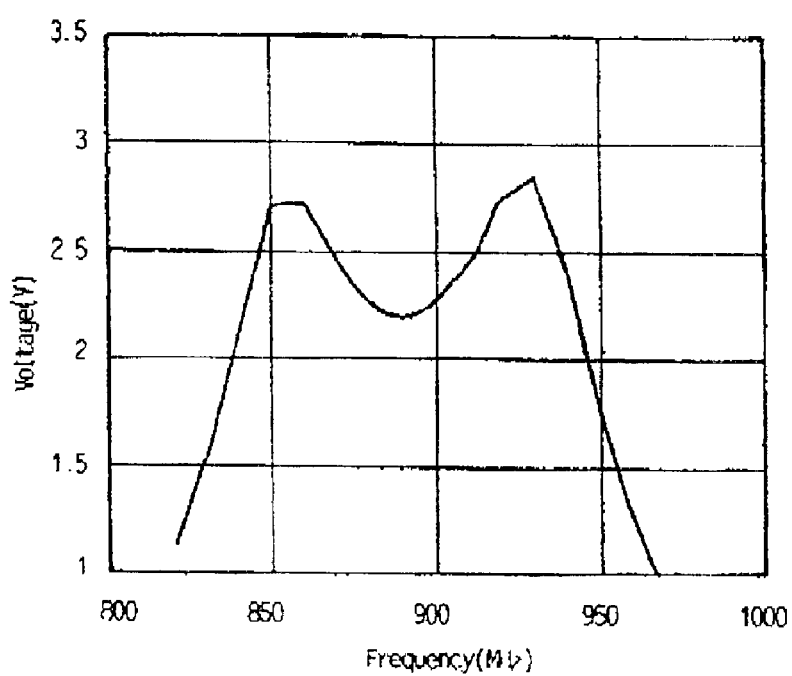
FIG. 7 is a diagram of voltage against frequency at point C of the transponder in FIG. 2 comprising the antenna in FIG. 6.

A second embodiment 218 of an antenna according to the invention for use with a transponder 14.1 is shown in FIG. 6. The antenna 218 is a shorted ring patch antenna comprising a ground plane 220 on one face of an insulating layer 222 of air and a conductive grid or layer 224 on another face and connected to the ground plane 220 as shown. The antenna 218 has a feedpoint 230 located in a region where there is a current minimum. A transmission line 232 having a length $l_1$ is integrated with the patch antenna and is also connected to the feedpoint 230. The resulting transponder 14.1 has a voltage against frequency curve at C in FIG. 2, as shown in FIG. 7. The curve clearly displays dual voltage maxima and consequent wideband characteristics.

Figure 8:
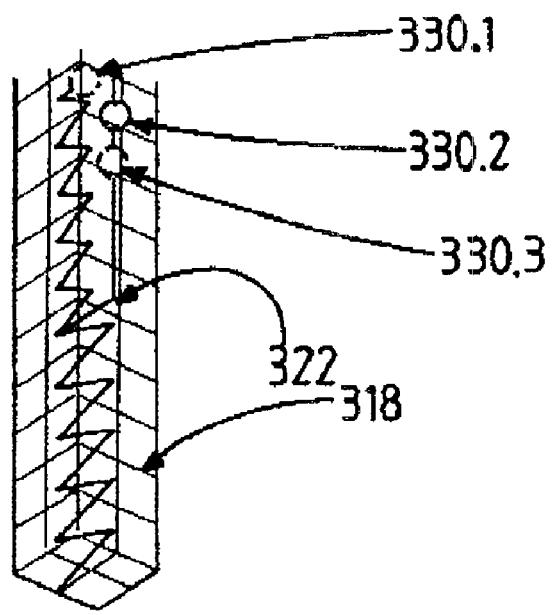
FIG. 8 is a diagram of a third embodiment of an antenna forming part of the transponder according to the invention.
Figure 9:
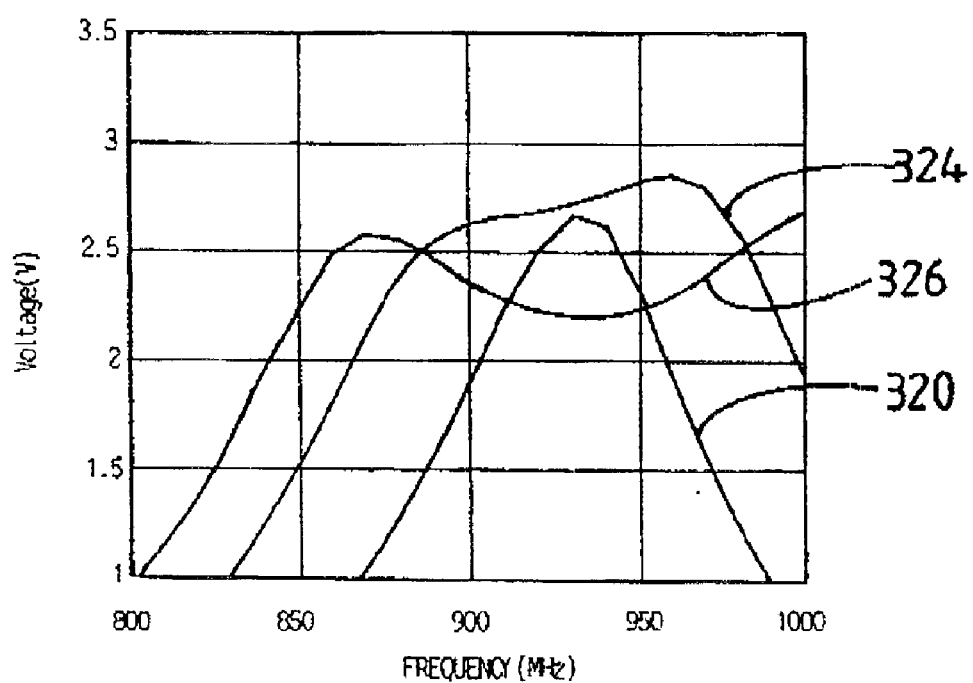
FIG. 9 is a diagram of voltage against frequency at point C of the transponder in FIG. 2 comprising the antenna in FIG. 8.

A third embodiment 318 of an antenna according to the invention for use with a transponder 14.1 is shown in FIG. 8. The antenna 318 is a zigzag hybrid loop. Three typical feedpoints 330.1, 330.2 and 330.3 are shown. At feedpoint 330.1, the antenna has a single voltage maximum as shown at 320 in FIG. 9. However, at feedpoint 330.2 or feedpoint 330.3, it exhibits dual voltage maxima characteristics. The dual mode operation is caused by different path lengths $l_1$ and $l_2$ (clockwise and anti-clockwise) around the loop 322. At the preferred feedpoint 330.2 the first and second frequencies are closer together, as shown at 324 in FIG. 9 and at feedpoint 330.3 the first and second frequencies are further apart, as shown at 326 in FIG. 9.

Figure 10:
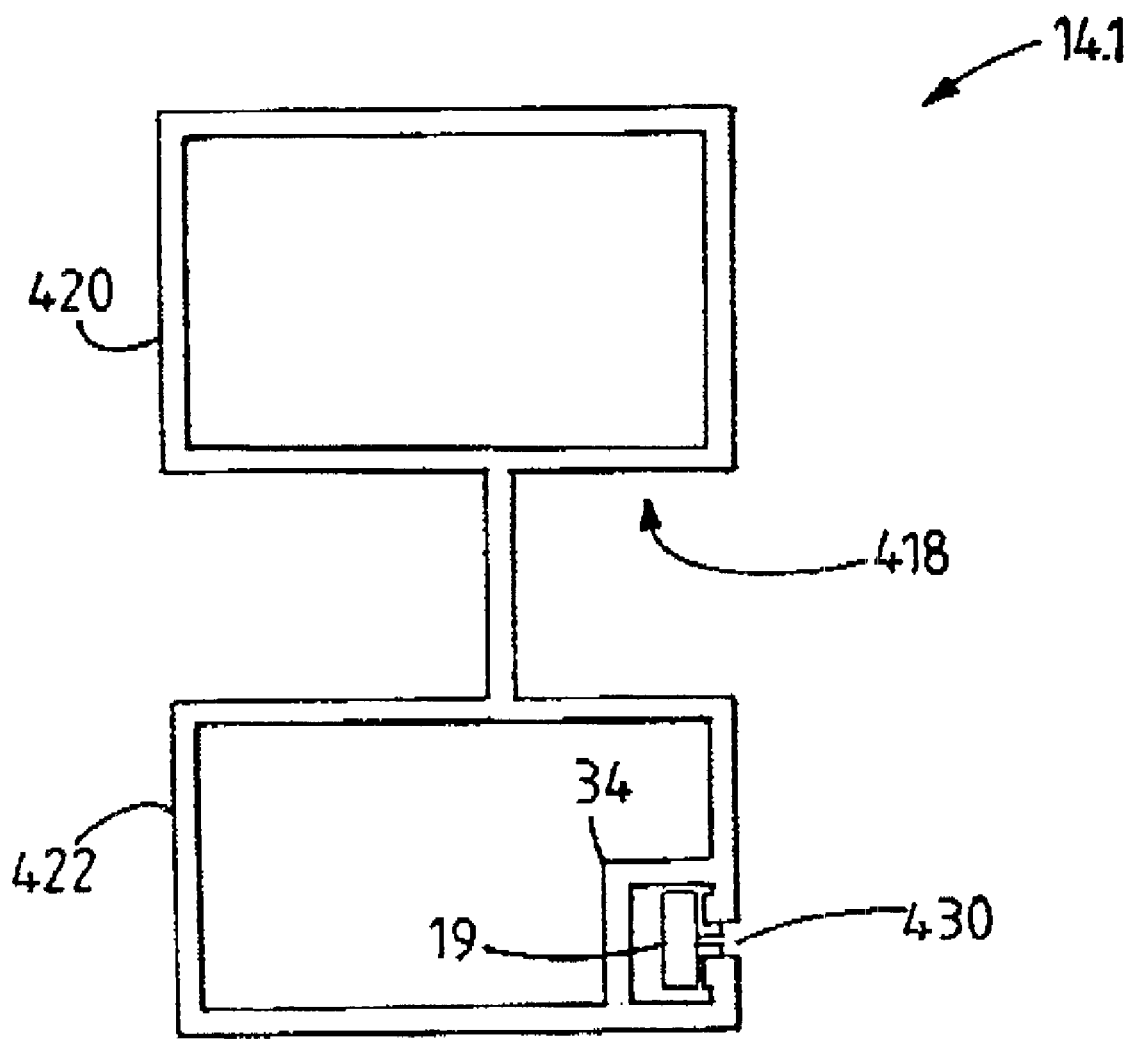
FIG. 10 is a diagram of a transponder according to the invention comprising a fourth embodiment of the antenna according to the invention.
Figure 11:
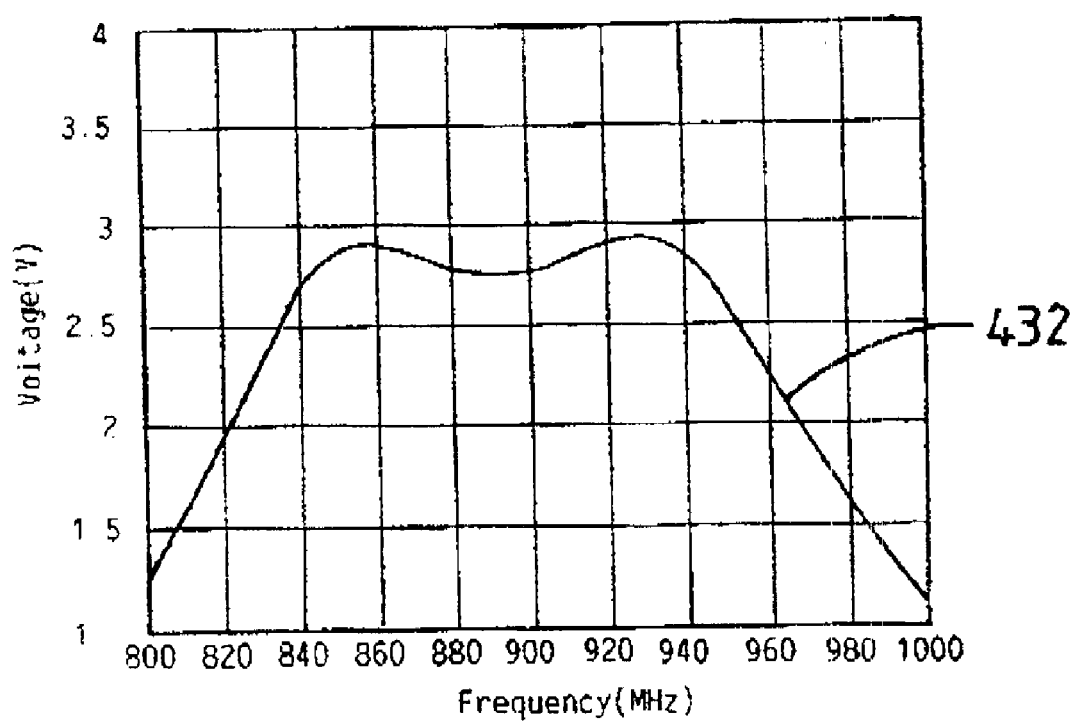
FIG. 11 is a diagram of voltage against frequency at an input of transponder circuitry forming part of the transponder in FIG. 10.

A fourth embodiment 418 of an antenna according to the invention for use with a transponder 14.1 is shown in FIG. 10. The antenna comprises first and second linked loops 420 and 422 and has a feedpoint 430, where IC 19 is connected to the antenna. The parallel tuning inductor is shown at 34. A curve of voltage at the input of IC 19 against frequency is shown at 432 in FIG. 12. The dual voltage maxima and consequent wideband characteristics covering the band 840 MHz to 950 MHz is clearly visible.

Figure 12:
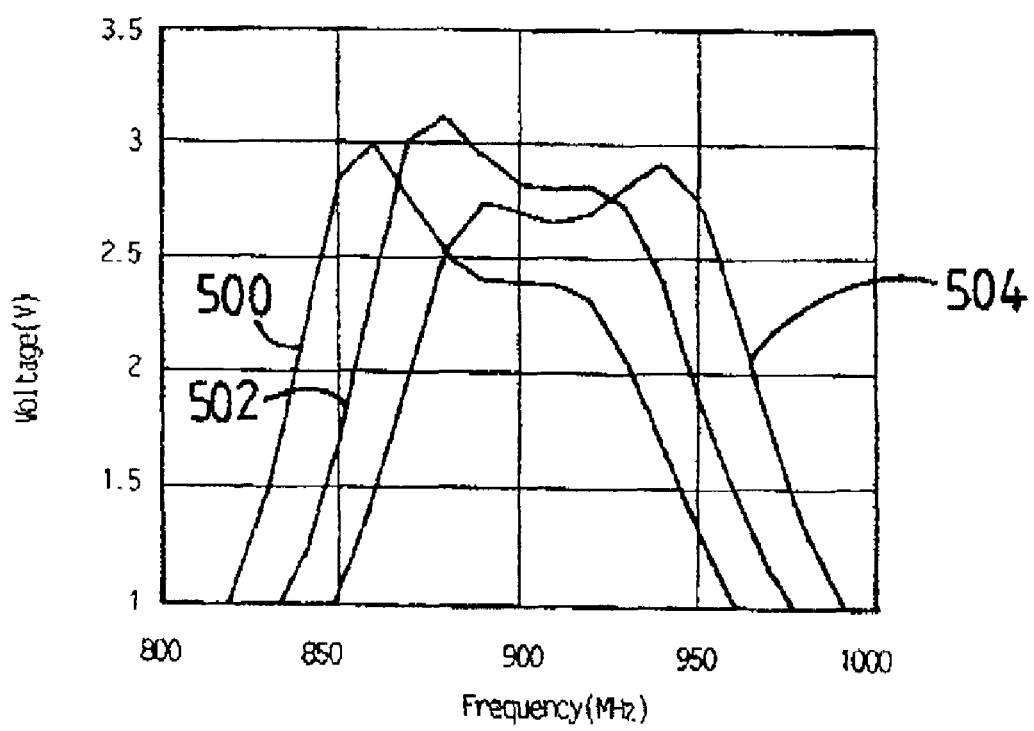
FIG. 12 is a diagram of voltage against frequency at point C of the transponder in FIG. 2 comprising the antenna in FIG. 4 for different values of a parallel inductor between the antenna and the transponder circuitry.

It has been found that the parallel inductor 34 between the antenna 18 and IC 19 cannot be used to add a further voltage maximum, but can advantageously be used to adjust or emphasize one existing maximum relative to another. The diagram in FIG. 12 illustrates the effect on the curve of the patch antenna in FIG. 4, if an inductor 34 is chosen such that the inductor 34 and IC capacitance resonate at any one of three different frequencies (860 MHz; 900 MHz and 940 MHz) in the region of $f_L$ and $f_H$. The resulting voltage against frequency curves are shown at 500, 502 and 504 in FIG. 12. It is shown that there is no additional voltage maximum, but that the voltage peaks can be adjusted using an appropriate tuned frequency for the LC network. The same method may be utilized to obtain a flatter response.

It will be appreciated that there are many variations in detail on the transponder, antenna, electronic identification system and method according to the invention without departing from the scope and spirit of the appended claims.

What is claimed is:

1. A transponder for an electronic radio frequency identification system, comprising:

an antenna having an antenna impedance at a feedpoint thereof; and an electronic circuit having an input impedance at an input thereof, the input being connected to the feedpoint, wherein the antenna impedance has impedance characteristics for developing first and second voltage maxima across the input at first and second frequencies respectively, thereby providing a continuous operative frequency band for the transponder including the first and second frequencies.

2. A transponder as claimed in claim 1, wherein the input impedance comprises a real component and a capacitive reactive component.

3. A transponder as claimed in claim 2, wherein an inductive element is connected between the antenna and the electronic circuit in parallel with the input impedance and which is operative to resonate with the capacitive component of the input impedance.

4. A transponder as claimed in claim 2, wherein the real component of the input impedance is at least 400 ohms.

5. A transponder as claimed in claim 1, wherein the first frequency is between 850 MHz and 900 MHz and the second frequency is between 900 MHz and 1 GHz.

6. A transponder as claimed in claim 1, wherein the antenna comprises one of a combination of a patch antenna and a transmission line both connected to the feed point, a combination of a shorted ring patch antenna and a transmission line both connected to the feed point, and a combination of a loop and an appendage to the loop.

7. A transponder as claimed in claim 1, wherein the first and second frequencies are associated with first and second dimensions of the antenna and wherein the first and second frequencies are selectable by selection of the first and second dimensions.

8. An antenna for a transponder of an electronic identification system, the transponder having an impedance, and the antenna having a feedpoint and an antenna impedance at the feedpoint, the antenna impedance having impedance characteristics for developing first and second voltage maxima at first and second frequencies, respectively, across the input impedance of the transponder.

9. An antenna as claimed in claim 8, comprising one of a combination of a patch antenna and a transmission line both connected to the feedpoint, a combination of a shorted ring patch antenna and a transmission line both connected to the feedpoint, and a combination of a loop and an appendage to the loop.

10. An antenna as claimed in 8, wherein the antenna comprises a combination of a first loop and an appendage to the first loop, and wherein the appendage comprises a second loop linked to the first loop.

11. An electronic radio frequency identification system comprising a reader and at least one transponder as claimed in claim 1.

* * * * *